US010982757B2

(12) United States Patent
Bai

(10) Patent No.: US 10,982,757 B2
(45) Date of Patent: Apr. 20, 2021

(54) HYDRAULIC CONTROL SYSTEM FOR A CONTINUOUSLY VARIABLE TRANSMISSION

(71) Applicant: GM Global Technology Operations LLC, Detroit, MI (US)

(72) Inventor: Shushan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 343 days.

(21) Appl. No.: 16/037,448

(22) Filed: Jul. 17, 2018

(65) Prior Publication Data

US 2020/0025290 A1    Jan. 23, 2020

(51) Int. Cl.
*F16H 61/02* (2006.01)
*F16H 61/662* (2006.01)
*F16H 61/00* (2006.01)
*F16H 9/16* (2006.01)

(52) U.S. Cl.
CPC ... *F16H 61/0267* (2013.01); *F16H 61/66263* (2013.01); *F16H 9/16* (2013.01); *F16H 61/0031* (2013.01); *F16H 61/0206* (2013.01); *F16H 61/66272* (2013.01); *F16H 2061/0034* (2013.01)

(58) Field of Classification Search
CPC ......... F16H 61/66272; F16H 61/66259; F16H 61/0031; F16H 2061/66286; F16H 61/0025
USPC .......................................................... 474/28
See application file for complete search history.

(56) References Cited

U.S. PATENT DOCUMENTS

| 2,830,543 | A | * | 4/1958 | Roth | F01C 21/0809 418/234 |
| 5,108,348 | A | * | 4/1992 | Bornmann | F16H 61/66272 474/18 |
| 6,219,608 | B1 | * | 4/2001 | Abo | F16H 61/66259 474/28 |
| 6,287,227 | B1 | * | 9/2001 | Vahabzadeh | F16H 61/66259 474/18 |
| 6,712,724 | B2 | * | 3/2004 | Katou | F16H 61/0031 474/18 |
| 6,739,994 | B1 | * | 5/2004 | Van Rooij | F16H 61/0031 474/18 |

(Continued)

FOREIGN PATENT DOCUMENTS

CN     102498298 A    6/2012

*Primary Examiner* — Henry Y Liu

(57) ABSTRACT

A hydraulic control system for a continuously variable transmission (CVT) includes a pressure regulator subsystem, a selection valve in downstream fluid communication with the pressure regulator subsystem, the selection valve configured to control a flow of pressurized oil from the pressure regulator subsystem to a primary pulley circuit and a secondary pulley circuit, the primary pulley circuit in fluid communication with a primary pulley and the secondary pulley circuit in communication with a secondary pulley, and a ratio control pump disposed in fluid communication between the primary pulley circuit and the secondary pulley circuit, wherein rotation of the ratio control pump in a first direction pumps pressurized oil from the secondary pulley circuit to the primary pulley circuit and rotation of the control pump in a second direction pumps pressurized oil from the primary pulley circuit to the secondary pulley circuit to change a ratio of the CVT.

18 Claims, 2 Drawing Sheets

(56) References Cited

U.S. PATENT DOCUMENTS

| | | | | |
|---|---|---|---|---|
| 6,890,275 B1* | 5/2005 | Piepenbrink | ...... | F16H 61/66263 |
| | | | | 474/18 |
| 7,387,589 B2* | 6/2008 | Suzuki | .............. | F16H 61/66254 |
| | | | | 474/12 |
| 7,918,753 B2* | 4/2011 | Murakami | ........ | F16H 61/66272 |
| | | | | 474/28 |
| 8,562,463 B2* | 10/2013 | Shioiri | .............. | F16H 61/66263 |
| | | | | 474/28 |
| 8,857,382 B2* | 10/2014 | Yagasaki | ............. | F16H 61/0025 |
| | | | | 123/2 |
| 9,188,218 B2* | 11/2015 | Lundberg | ............ | F16H 61/0031 |
| 9,194,465 B2* | 11/2015 | Lundberg | ................ | F16H 61/14 |
| 9,422,951 B2* | 8/2016 | Inagaki | ............... | F16H 57/0404 |
| 9,574,654 B2* | 2/2017 | Lundberg | ............ | F16H 61/0021 |
| 9,689,493 B2* | 6/2017 | Lundberg | .......... | F16H 61/66272 |
| 9,816,610 B2* | 11/2017 | Van Rooij | ......... | F16H 61/66272 |
| 10,364,887 B2* | 7/2019 | Van Rooij | ............ | F16H 61/662 |
| 10,458,546 B2* | 10/2019 | Toyohara | ............ | F16H 61/0031 |
| 2011/0038745 A1* | 2/2011 | Kurylowski | .......... | F04C 2/3446 |
| | | | | 418/15 |
| 2013/0312675 A1* | 11/2013 | Yagasaki | ........... | F16H 61/66272 |
| | | | | 123/2 |

* cited by examiner

HYDRAULIC CONTROL SYSTEM FOR A CONTINUOUSLY VARIABLE TRANSMISSION

INTRODUCTION

The present disclosure relates to a hydraulic control system for a continuously variable transmission (CVT), and more particularly to a hydraulic control system with energy saving ratio control for a belt or chain CVT.

A typical continuously variable transmission (CVT) includes a hydraulic control system that is employed to provide cooling and lubrication to components within the CVT and to actuate torque transmitting devices such as drive clutches or torque converter clutches, and belt pulley positions. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices and the pulleys that move the belt of the CVT. The pressurized hydraulic fluid delivered to the pulleys is used to position the belt relative to input and output variators in order to obtain different gear ratios.

In current CVT hydraulic control systems, the pressure and flow of primary and secondary pulley cylinders are controlled by two separate pressure control valves. These two pressure control valves are supplied by the main pressure from the pressure regulator subsystem, therefore the main pressure should be higher than the higher pressure among the primary and secondary pulley pressures. The primary pulley and secondary pulley pressures are determined by the input torque and ratio position. The lower pulley pressure of the two pulleys determines the torque capacity of the CVT, and the higher pulley pressure determines the ratio position. Also, the ratio of primary pulley pressure versus secondary pulley pressure ranges from 0.25 to 2.5, depending on the input torque and ratio position. Therefore, with the current hydraulic control system, the main pressure may be as high as 2.5 times of the pressure required to provide the torque capacity. This high main pressure represents high power loss. While these current hydraulic control systems are effective for their intended purpose, there is a need in the art for a hydraulic control system for a CVT that lowers the main pressure to the level equal to the lower pressure among the primary cylinder and the second cylinder while achieving any desired ratio position, therefore reducing the power loss of hydraulic control system.

SUMMARY

According to several aspects, a hydraulic control system for a continuously variable transmission (CVT) to control a primary pulley and a secondary pulley linked by a chain or belt includes a pressure regulator subsystem providing a pressurized oil, a selection valve in downstream fluid communication with the pressure regulator subsystem, the selection valve configured to control a flow of pressurized oil from the pressure regulator subsystem to a primary pulley circuit and a secondary pulley circuit, the primary pulley circuit in fluid communication with the primary pulley and the secondary pulley circuit in communication with the secondary pulley, and a ratio control pump driven by an electric motor and disposed in fluid communication between the primary pulley circuit and the secondary pulley circuit, wherein rotation of the ratio control pump in a first direction pumps pressurized oil from the secondary pulley circuit to the primary pulley circuit and rotation of the control pump in a second direction pumps pressurized oil from the primary pulley circuit to the secondary pulley circuit to change a ratio of the CVT.

In one aspect, the selection valve is configured to communicate the flow of pressurized oil from the pressure regulator subsystem to whichever of the primary pulley circuit and the secondary pulley circuit has less oil pressure.

In another aspect, a speed of rotation of the ratio control pump is controlled to control a rate of change of the ratio of the CVT.

In another aspect, a primary accumulator is in fluid communication with the primary pulley circuit, wherein the primary accumulator is configured to maintain a pressure in the primary pulley circuit when the ratio control pump is not rotating.

In another aspect, a secondary accumulator is in fluid communication with the secondary pulley circuit, wherein the secondary accumulator is configured to maintain a pressure in the secondary pulley circuit when the ratio control pump is not rotating.

In another aspect, an electric motor is provided for controlling a rotation direction and rotation speed of the ratio control pump.

In another aspect, an anti-drive back mechanism is connected to the ratio control pump to selectively prevent the ratio control pump from rotating due to pressure in the primary pulley circuit or the secondary pulley circuit.

In another aspect, the selection valve includes a spool having a first end land and a second end land each sealed to and slidably disposed within a bore, the bore having a main inlet port disposed between the first end land and the second end land, a primary outlet port disposed between the first end land and the second end land, a primary feedback port disposed at the first end land, a secondary outlet port disposed between the first end land and the second end land, and a secondary feedback port disposed at the second end land, wherein the main inlet port communicates with the pressure regulator subsystem, the primary outlet port and the primary feedback port communicates with the primary pulley circuit and the secondary outlet port and the secondary feedback port communicates with the secondary pulley circuit, and wherein movement of the spool selectively connects the main inlet port with the primary outlet port or connects the main inlet port with the secondary outlet port.

In another aspect, the selection valve includes a first one-way valve and a second one-way valve disposed end to end and having a main inlet port disposed between the two one-way valves, a primary outlet port disposed at one end of the first one-way valve, and a secondary outlet port disposed at one end of the second one-way valve, wherein the main inlet port communicates with the pressure regulator subsystem, the primary outlet port communicates with the primary pulley circuit, and the secondary outlet port communicates with the secondary pulley circuit, and wherein the first one-way valve prevents fluid communication between the main inlet port and the primary outlet port when a pressure in the primary pulley circuit is greater than a pressure in the secondary pulley circuit and the second one-way valve prevents fluid communication between the main inlet port and the secondary outlet port when a pressure in the secondary pulley circuit is greater than a pressure in the primary pulley circuit.

In another aspect, the ratio control pump includes a first primary port and a second primary port each in fluid communication with the primary pulley circuit, a first secondary port and a second secondary port each in fluid communication with the secondary pulley circuit, and rotation of the ratio control pump in the first direction pumps oil from the first secondary port to the first primary port and from the second secondary port to the second primary port, and rotation of the ratio control pump in the second direction pumps oil from the first primary port to the first secondary port and from the second primary port to the second secondary port.

In another aspect, the pressure regulator subsystem includes an engine driven pump in fluid communication with a pressure regulation valve, the pressure regulation valve communicating the pressurized oil from the pressure regulator subsystem to the selection valve.

According to several other aspects, a hydraulic control system for a continuously variable transmission (CVT) to control a primary pulley and a secondary pulley linked by a chain or belt includes a pressure regulator subsystem providing a pressurized oil, a selection valve in downstream fluid communication with the pressure regulator subsystem, the selection valve configured to control a flow of pressurized oil from the pressure regulator subsystem to a primary pulley circuit and a secondary pulley circuit, the primary pulley circuit in fluid communication with the primary pulley and the secondary pulley circuit in communication with the secondary pulley, wherein the selection valve is configured to communicate the flow of pressurized oil from the pressure regulator subsystem to whichever of the primary pulley circuit and the secondary pulley circuit has less oil pressure, and a ratio control pump disposed in fluid communication between the primary pulley circuit and the secondary pulley circuit, wherein rotation of the ratio control pump in a first direction pumps pressurized oil from the secondary fluid line to the primary fluid line and rotation of the control pump in a second direction pumps pressurized oil from the primary pulley circuit to the secondary pulley circuit to change a ratio of the CVT, and a speed of rotation of the ratio control pump controls a rate of change of the ratio of the CVT.

In one aspect, a primary accumulator is in fluid communication with the primary pulley circuit, wherein the primary accumulator is configured to maintain a pressure in the primary pulley circuit when the ratio control pump is not rotating.

In another aspect, a secondary accumulator is in fluid communication with the secondary pulley circuit, wherein the secondary accumulator is configured to maintain a pressure in the secondary pulley circuit when the ratio control pump is not rotating.

In another aspect, an electric motor is provided for controlling a rotation direction and rotation speed of the ratio control pump.

In another aspect, an anti-drive back mechanism is connected to the ratio control pump to selectively prevent the ratio control pump from rotating due to pressure in the primary fluid line or the secondary fluid line.

In another aspect, the selection valve includes a spool having a first end land and a second end land each sealed to and slidably disposed within a bore, the bore having a main inlet port disposed between the first end land and the second end land, a primary outlet port disposed between the first end land and the second end land, a primary feedback port disposed at the first end land, a secondary outlet port disposed between the first end land and the second end land, and a secondary feedback port disposed at the second end land, wherein the main inlet port communicates with the pressure regulator subsystem, the primary outlet port and the primary feedback port communicates with the primary pulley circuit and the secondary outlet port and the secondary feedback port communicates with the secondary pulley circuit, and wherein movement of the spool selectively connects the main inlet port with the primary outlet port or connects the main inlet port with the secondary outlet port.

In another aspect, the selection valve includes a first one-way valve and a second one-way valve disposed end to end and having a main inlet port disposed between the two one-way valves, a primary outlet port disposed at one end of the first one-way valve, and a secondary outlet port disposed at one end of the second one-way valve, wherein the main inlet port communicates with the pressure regulator subsystem, the primary outlet port communicates with the primary pulley circuit, and the secondary outlet port communicates with the secondary pulley circuit, and wherein the first one-way valve prevents fluid communication between the main inlet port and the primary outlet port when a pressure in the primary pulley circuit is greater than a pressure in the secondary pulley circuit and the second one-way valve prevents fluid communication between the main inlet port and the secondary outlet port when a pressure in the secondary pulley circuit is greater than a pressure in the primary pulley circuit.

In another aspect, the ratio control pump includes a first primary port and a second primary port each in fluid communication with the primary pulley circuit, a first secondary port and a second secondary port each in fluid communication with the secondary pulley circuit, and rotation of the ratio control pump in the first direction pumps oil from the first secondary port to the first primary port and from the second secondary port to the second primary port, and rotation of the ratio control pump in the second direction pumps oil from the first primary port to the first secondary port and from the second primary port to the second secondary port.

According to several other aspects, a hydraulic control system for a continuously variable transmission (CVT) to control a primary pulley and a secondary pulley linked by a chain or belt includes a pressure regulator subsystem providing a pressurized oil, a selection valve in downstream fluid communication with the pressure regulator subsystem, the selection valve configured to control a flow of pressurized oil from the pressure regulator subsystem to a primary pulley circuit and a secondary pulley circuit, the primary pulley circuit in fluid communication with the primary pulley and the secondary pulley circuit in communication with the secondary pulley, wherein the selection valve is configured to communicate the flow of pressurized oil from the pressure regulator subsystem to whichever of the primary pulley circuit and the secondary pulley circuit has less oil pressure, a ratio control pump disposed in fluid communication between the primary pulley circuit and the secondary pulley circuit, wherein rotation of the ratio control pump in a first direction pumps pressurized oil from the secondary fluid line to the primary fluid line and rotation of the control pump in a second direction pumps pressurized oil from the primary pulley circuit to the secondary pulley circuit to change a ratio of the CVT, and a speed of rotation of the ratio control pump controls a rate of change of the ratio of the CVT, an electric motor interconnected to the ratio control pump for controlling a rotation direction and rotation speed of the ratio control pump, an anti-drive back mechanism connected between the electric motor and the ratio control pump to selectively prevent the ratio control pump from rotating due to pressure in the primary fluid line or the secondary fluid line when the electric motor is off, a primary accumulator in fluid communication with the primary pulley circuit, wherein the primary accumulator is configured to maintain a pressure in the primary pulley circuit when the electric motor is off, and a secondary accumulator in fluid communication with the secondary pulley circuit, wherein the secondary accumulator is configured to maintain a pressure in the secondary pulley circuit when the electric motor is off.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
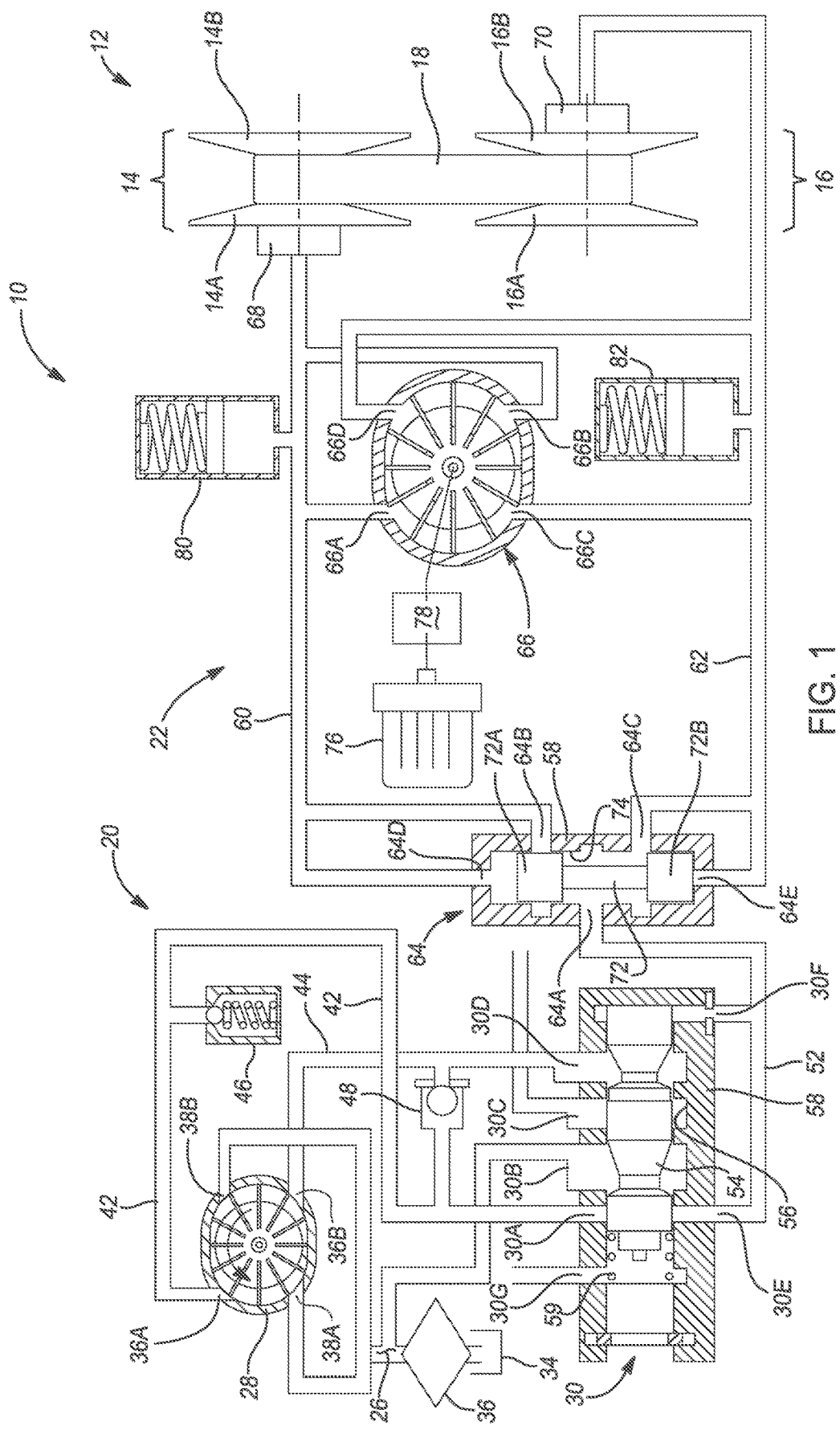
FIG. 1 is a diagram of a portion of a hydraulic control system for a chain or belt CVT.

With reference to FIG. 1, a hydraulic control system according to the principles of the present invention is generally indicated by reference number 10. The hydraulic control system 10 is used to control a belt or chain continuously variable transmission (CVT) 12. The CVT 12 may have various configurations, for example configured as one-mode, two-mode, three-mode, etc., without departing from the scope of the present disclosure. Generally, however, the CVT 12 of the present disclosure includes a primary pulley or sheave pair 14 and a secondary pulley or sheave pair 16. The primary pulley 14 may be connected with a transmission input shaft (not shown) or other connection. The primary pulley 14 includes a first truncated conical sheave or member 14A and a second truncated conical sheave or member 14B in axial alignment with the first truncated conical sheave 14A. The first sheave 14A is moveable axially relative to the second sheave 14B by the hydraulic control system 10, as will be described below. It should be appreciated that the sheaves 14A and 14B may be axially switched without departing from the scope of the present disclosure.

The secondary pulley 16 includes a first truncated conical sheave or member 16A and second truncated conical sheave or member 16B in axial alignment with the first truncated conical sheave 16A. The second sheave 16B is moveable axially relative to the first sheave 16A by the hydraulic control system 10 as will be described below. It should be appreciated that the sheaves 16A and 16B may be axially switched without departing from the scope of the present invention. The secondary pulley 16 may be connected with a transfer shaft, gearing, or a transmission output shaft (not shown).

A torque transmitting belt or chain 18 having a V-shaped cross section is mounted between the primary pulley 14 and the secondary pulley 16. Drive torque communicated from an engine or electric motor (not shown) is transferred via friction between the sheaves 14A and 14B and the belt 18, and from the belt 18 to the sheaves 16A and 16B. The ratio of the primary pulley 14 to the secondary pulley 16 is adjusted by varying the spacing between the sheaves 14A and 14B and between the sheaves 16A and 16B. For example, to change the ratio between the primary pulley 14 and the secondary pulley 16, the axial distance between sheaves 14A and 14B may be reduced by moving sheave 14A towards sheave 14B while simultaneously the axial distance between sheave 16A and 16B may be increased by moving sheave 16B away from sheave 16AB. Due to the V-shaped cross section of the belt 18, the belt 18 rides higher on the primary pulley 14 and lower on the secondary pulley 16. Therefore the effective diameters of the primary pulley 14 and the secondary pulley 16 change, which in turn changes the overall gear ratio between the primary pulley 14 and the secondary pulley 16. Since the radial distance between the primary pulley 14 and the secondary pulley 16 and the length of the belt 18 are constant, the movement of the sheaves 14A and 16B must occur simultaneously in order to maintain the proper amount of tension on the belt 18 to assure torque is transferred from the primary pulley 14 and the secondary pulley 16 to the belt 18.

As noted above, the hydraulic control system 10 is configured to control the movement of the primary pulley 14 and the secondary pulley 16 and therefore to control the gear ratio of the CVT 12 as well as the rate of change of the gear ratio. The hydraulic control system 10, as shown, includes a plurality of interconnected or hydraulically communicating circuits or subsystems including a pressure regulator subsystem 20 and a ratio control subsystem 22. It should be appreciated that the hydraulic control system 10 may include various other subsystems, for example, a torque converter control subsystem, a clutch control subsystem, and an electronic transmission range selection (ETRS) subsystem, a cooling and lubrication subsystem, etc. without departing from the scope of the present disclosure.

The pressure regulator subsystem 20 is operable to provide and regulate a hydraulic fluid 26, such as oil, at a main line pressure to the ratio control subsystem 22. The pressure regulator subsystem 20 may take various forms and configurations but generally includes an engine driven pump 28 and a pressure regulator valve 30. The pressure regulator subsystem 20 draws the hydraulic fluid 26 from a sump 34. The sump 34 is a tank or reservoir preferably disposed at the bottom of a transmission housing to which the hydraulic fluid 26 returns and collects from various components and regions of the CVT 12. The hydraulic fluid 26 is forced from the sump 34 and communicated through a sump filter 36 to the pressure regulator valve 30 via the pump 28. The pump 28 is preferably driven by an engine or electric motor (not shown) and may be, for example, a gear pump, a vane pump, a gerotor pump, or any other positive displacement pump. In the example provided, the pump 28 includes outlet ports 36A and 36B and an inlet ports 38A and 38B. The inlet ports 38A and 38B communicate with the sump 34. The outlet ports 36A and 36B communicate the hydraulic fluid 26 at a pump pressure to the pressure regulator valve 30 via a primary supply line 42 and a secondary supply line 44. A spring biased blow-off safety valve 46 in communication with the primary supply line 42 may be included. The spring biased blow-off safety valve 46 is set at a relatively high predetermined pressure and if the pressure of the hydraulic fluid 26 from the pump 28 exceeds this pressure, the spring biased blow-off safety valve 46 opens momentarily to relieve and reduce the pressure of the hydraulic fluid 40. Also, a one-way valve 48 may be included between the primary supply line 42 and the secondary supply line 44.

The pressure regulator valve 30 is configured to receive the hydraulic fluid 26 at pump pressure from the pump 28 and bleed off pressure, as needed, to supply the hydraulic fluid 26 to a main supply line 52 at a main line pressure, and to other subsystems at other pressures. The pressure regulator valve 30 may have various configurations without departing from the scope of the present disclosure. However, generally, the pressure regulator valve 30 includes a spool valve 54 slidably disposed in a bore 56 of the main valve body 58. A spring 59 biases the spool valve 54. In the example provided, the pressure regulator valve 30 includes at least ports 30A-G formed in the bore 56. Port 30A is in communication with the primary supply line 42. Port 30B communicates with the sump 34. Port 30C communicates with one or more other subsystems (not shown). Port 30D is in communication with the secondary supply line 44. Port 30E communicates with the main supply line 52. Port 30F is a pressure feedback port that also communicates with the main supply line 52. Port 30G communicates with a variable force solenoid (not shown) to assist, with the spring 59, in moving the spool valve 54. Movement of the spool valve 54 selectively allows fluid communication between port 30A and 30E while bleeding off excess pressure to port 30B. The spool valve 54 automatically changes position to dump excess flow from the primary supply line 42 to the sump 34 until a pressure balance is achieved between a commanded pressure and the actual pressure in the main supply line 52.

The main supply line 52 provides the hydraulic fluid 26 at main line pressure to the ratio control subsystem 22. The ratio control subsystem 22 includes a primary pulley circuit or primary 60 and a secondary pulley circuit 62. The primary pulley circuit 60 is in fluid communication with a primary pulley cylinder 68 on the primary pulley 14 and the secondary pulley circuit is in fluid communication with a secondary pulley cylinder 70 on the secondary pulley 16. The ratio control subsystem 22 is used to provide main line pressure to whichever of a primary pulley circuit 60 and a secondary pulley circuit 62 that has the lower pressure using a selection valve 64 and to control movement of the primary pulley 14 and the secondary pulley 16, and thus the gear ratio and rate of change of the gear ratio of the CVT 12, by selectively transferring hydraulic fluid between the primary pulley circuit 60 and the secondary pulley circuit 62 using a dedicated ratio control pump 66.

The selection valve 64 a spool valve 72 slidably disposed within a bore 74 formed in the main valve body 58. The spool valve 72 has a first end land 72A and a second end land 72B slidably sealed to the bore 74. The selection valve 64 includes ports 64A-E formed in the bore 74. A main inlet port 64A is disposed between the first end land 72A and the second end land 72B and is connected to the main supply line 52 and thus receives hydraulic fluid 26 at main line pressure. A primary outlet port 64B is disposed between the first end land 72A and the second end land 72B and is connected to the primary pulley circuit 60. The primary outlet port 64B is selectively closed by the first end land 72A. A secondary outlet port 64C is disposed between the first end land 72A and the second end land 72B and is connected to the secondary pulley circuit 62. The secondary outlet port 64C is selectively closed by the second end land 72B. A primary feedback port 64D is disposed at a distal end of the first end land 72A. The primary feedback port 64D is in communication with the primary pulley circuit 60 and pressure in the primary pulley circuit 60 acts on the distal end of the first end land 72A. A secondary feedback port 64E is disposed at a distal end of the second end land 72B. The secondary feedback port 64E is in communication with the secondary pulley circuit 62 and pressure in the secondary pulley circuit 62 acts on the distal end of the second end land 72B.

Thus, due to feedback pressure acting on the first end land 72A and the second end land 72B, the spool valve 72 will move to close one of the primary outlet port 64B and the secondary outlet port 64C. For example, if the pressure of hydraulic fluid 26 in the primary pulley circuit 60 is greater than the pressure of the hydraulic fluid 26 in the secondary pulley circuit 62, the spool valve will move to the position shown in FIG. 1 and the first end land 72A will block the primary outlet port 64B while allowing the main inlet port 64A to communicate hydraulic fluid 26 at main line pressure to the secondary outlet port 64C and thus the secondary pulley circuit 62. If the pressure of hydraulic fluid 26 in the secondary pulley circuit 62 then exceeds the pressure of the hydraulic fluid 26 in the primary pulley circuit 60, the spool valve will move "up" relative to the position shown in FIG. 1 and the second end land 72B will block the secondary outlet port 64C while allowing the main inlet port 64A to communicate hydraulic fluid 26 at main line pressure to the primary outlet port 64B and thus the primary pulley circuit 60. In this way, the selection valve 64 assures that main line pressure is only communicated to whichever of the primary pulley 14 and the secondary pulley 16 is receiving the lowest pressure of hydraulic fluid, thus achieving the desired torque capacity of the CVT 12.

Figure 2:
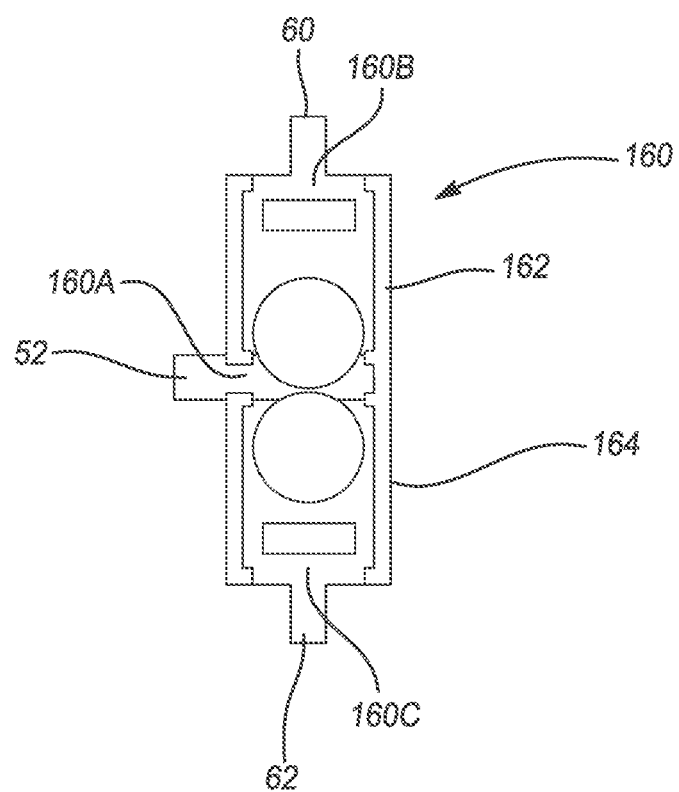
FIG. 2 is a diagram of a portion of an alternative valve arrangement used with the hydraulic control system shown in FIG. 1.

Turning briefly to FIG. 2, in an alternate embodiment, the selection valve 64 may be replaced with a selection valve 160. The selection valve 160 functions in a similar way to the selection valve 64 but instead includes a first one-way valve 162 and a second one-way valve 164 disposed end to end. A main inlet port 160A is disposed between the first one-way valve 162 and the second one-way valve 164, a primary outlet port 160B is disposed at one end of the first one-way valve 162, and a secondary outlet port 160C is disposed at one end of the second one-way valve 164. The main inlet port 160A communicates with the main supply line 52, the primary outlet port 160B communicates with the primary pulley circuit 60, and the secondary outlet port 160C communicates with the secondary pulley circuit 62. The first one-way valve 162 prevents fluid communication between the main inlet port 160A and the primary outlet port 160B when a pressure in the primary pulley circuit 60 is greater than a pressure in the secondary pulley circuit 62 and the second one-way valve 164 prevents fluid communication between the main inlet port 160A and the secondary outlet port 160C when a pressure in the secondary pulley circuit 62 is greater than a pressure in the primary pulley circuit 60.

Returning to FIG. 1, the ratio control pump 66 is disposed between the primary pulley circuit 60 and the secondary pulley circuit 62. The ratio control pump 66 selectively moves hydraulic fluid 26 between the primary pulley circuit 60 and the secondary pulley circuit 62. The ratio control pump 66 is preferably selectively driven by electric motor 76 in a first rotational direction and a second rotational direction. The ratio control pump 66 may be, for example, a gear pump, a vane pump, a gerotor pump, or any other positive displacement pump. A speed reduction and anti-drive back mechanism 78 is connected between the electric motor 76 and the ratio control pump 66. The anti-drive back mechanism 78 is configured to selectively prevent the ratio control pump 66 from rotating due to fluid pressure in the primary pulley circuit 60 or the secondary pulley circuit 62 when the electric motor 76 is off. In the example provided, the ratio control pump 66 includes a first primary port 66A, a second primary port 66B, a first secondary port 66C, and a second secondary port 66D. The first primary port 66A and the second primary port 66B communicate with the primary pulley circuit 60. The first secondary port 66C and the second secondary port 66D communicate with the secondary pulley circuit 62. Depending on the rotational direction of the ratio control pump 66, hydraulic fluid 26 is pumped between the first primary port 66A and the first secondary port 66C and between the second primary port 66B and the second secondary port 66D.

For example, when the ratio control pump 66 is rotated clockwise as shown in FIG. 1, hydraulic fluid 26 is pumped from the first secondary port 66C to the first primary port 66A and from the second secondary port 66D to the second primary port 66B, thus creating hydraulic fluid flow from the secondary pulley circuit 62 to the primary pulley circuit 60. The flow of hydraulic fluid 26 on the primary pulley cylinder 68 and the subsequent loss of pressure on the secondary pulley cylinder 70 moves the primary pulley 14 and the secondary pulley 16 to change the gear ratio. Likewise, when the ratio control pump 66 is rotated counter-clockwise as shown in FIG. 1, hydraulic fluid 26 is pumped from the first primary port 66A to the first secondary port 66C and from the second primary port 66B to the second secondary port 66D, thus creating hydraulic fluid flow from the primary pulley circuit 60 to the secondary pulley circuit 62. The flow of hydraulic fluid 26 on the secondary pulley cylinder 70 and the subsequent loss of pressure on the primary pulley cylinder 68 moves the primary pulley 14 and the secondary pulley 16 to change the gear ratio. The rate of change of the gear ratio may be controlled by controlling the rotational speed, or RPM, of the ratio control pump 66.

To maintain pressure in the primary pulley circuit 60 and the secondary pulley circuit 62 when the electric motor 76 is off, the ratio control subsystem 22 further includes a primary accumulator 80 and a secondary accumulator 82. The primary accumulator 80 is in fluid communication with the primary pulley circuit 60. The primary accumulator 80 is an energy storage device in which the non-compressible hydraulic fluid 26 is held under pressure by an external source. In the example provided, the primary accumulator 80 is a spring type or gas filled type accumulator having a spring or compressible gas or both that provides a compressive force on the hydraulic fluid 26 within the primary accumulator 80. However, it should be appreciated that the primary accumulator 80 may be of other types, such as a gas-charged type, without departing from the scope of the present invention.

The secondary accumulator 82 is in fluid communication with the secondary pulley circuit 62. The secondary accumulator 82 is an energy storage device in which the non-compressible hydraulic fluid 26 is held under pressure by an external source. In the example provided, the secondary accumulator 82 is a spring type or gas filled type accumulator having a spring or compressible gas or both that provides a compressive force on the hydraulic fluid 26 within the secondary accumulator 82. However, it should be appreciated that the secondary accumulator 82 may be of other types, such as a gas-charged type, without departing from the scope of the present invention.

The hydraulic control system 10 of the present disclosure includes many advantages. First, the main line pressure is only provided to and maintains the lower pressure at the primary pulley cylinder 68 and the secondary pulley cylinder 70 to achieve the desired torque capacity of the CVT 12, therefore reducing the power loss of the hydraulic control system 10. Second, the CVT ratio position control is achieved by rotating the ratio control pump 66 clockwise and counter-clockwise based on the direction of ratio changing by the electric motor 76. Third, in the case where no ratio changing is required, the electric motor 76 can be turned off to conserve electrical energy, and the higher pressure among the primary pulley circuit 60 and the secondary pulley circuit 62 is maintained by the anti-drive back mechanism 78 and corresponding accumulator 80, 82.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hydraulic control system for a continuously variable transmission (CVT) to control a primary pulley and a secondary pulley linked by a chain or belt, the hydraulic control system comprising:
   a pressure regulator subsystem providing a pressurized oil;
   a selection valve in downstream fluid communication with the pressure regulator subsystem, the selection valve configured to control a flow of pressurized oil from the pressure regulator subsystem to a primary pulley circuit and a secondary pulley circuit, the primary pulley circuit in fluid communication with the primary pulley and the secondary pulley circuit in communication with the secondary pulley;
   a ratio control pump disposed in fluid communication between the primary pulley circuit and the secondary pulley circuit, wherein rotation of the ratio control pump in a first direction pumps pressurized oil from the secondary pulley circuit to the primary pulley circuit and rotation of the control pump in a second direction pumps pressurized oil from the primary pulley circuit to the secondary pulley circuit to change a ratio of the CVT;
   a primary accumulator in fluid communication with the primary pulley circuit, wherein the primary accumulator is configured to maintain a pressure in the primary pulley circuit when the ratio control pump is not rotating; and
   an electric motor connected to the ratio control pump for controlling a rotation direction of the ratio control pump.

2. The hydraulic control system of claim 1 wherein the selection valve is configured to communicate the flow of pressurized oil from the pressure regulator subsystem to whichever of the primary pulley circuit and the secondary pulley circuit has less oil pressure.

3. The hydraulic control system of claim 1 wherein a speed of rotation of the ratio control pump is controlled to control a rate of change of the ratio of the CVT.

4. The hydraulic control system of claim 1 further comprising a secondary accumulator in fluid communication with the secondary pulley circuit, wherein the secondary accumulator is configured to maintain a pressure in the secondary pulley circuit when the ratio control pump is not rotating.

5. The hydraulic control system of claim 1 wherein the electric motor further controls a rotation speed of the ratio control pump.

6. The hydraulic control system of claim 5 further comprising an anti-drive back mechanism connected to the ratio control pump to selectively prevent the ratio control pump from rotating due to pressure in the primary pulley circuit or the secondary pulley circuit.

7. The hydraulic control system of claim 1 wherein the selection valve includes a spool having a first end land and a second end land each sealed to and slidably disposed within a bore, the bore having a main inlet port disposed between the first end land and the second end land, a primary outlet port disposed between the first end land and the second end land, a primary feedback port disposed at the first end land, a secondary outlet port disposed between the first end land and the second end land, and a secondary feedback port disposed at the second end land, wherein the main inlet port communicates with the pressure regulator subsystem, the primary outlet port and the primary feedback port communicates with the primary pulley circuit and the secondary outlet port and the secondary feedback port communicates with the secondary pulley circuit, and wherein movement of the spool selectively connects the main inlet port with the primary outlet port or connects the main inlet port with the secondary outlet port.

8. The hydraulic control system of claim 1 wherein the selection valve includes a first one-way valve and a second one-way valve disposed end to end and having a main inlet port disposed between the two one-way valves, a primary outlet port disposed at one end of the first one-way valve, and a secondary outlet port disposed at one end of the second one-way valve, wherein the main inlet port communicates with the pressure regulator subsystem, the primary outlet port communicates with the primary pulley circuit, and the secondary outlet port communicates with the secondary pulley circuit, and wherein the first one-way valve prevents fluid communication between the main inlet port and the primary outlet port when a pressure in the primary pulley circuit is greater than a pressure in the secondary pulley circuit and the second one-way valve prevents fluid communication between the main inlet port and the secondary outlet port when a pressure in the secondary pulley circuit is greater than a pressure in the primary pulley circuit.

9. The hydraulic control system of claim 1 wherein the ratio control pump includes a first primary port and a second primary port each in fluid communication with the primary pulley circuit, a first secondary port and a second secondary port each in fluid communication with the secondary pulley circuit, and rotation of the ratio control pump in the first direction pumps oil from the first secondary port to the first primary port and from the second secondary port to the second primary port, and rotation of the ratio control pump in the second direction pumps oil from the first primary port to the first secondary port and from the second primary port to the second secondary port.

10. The hydraulic control system of claim 1 wherein the pressure regulator subsystem includes an engine driven pump in fluid communication with a pressure regulation valve, the pressure regulation valve communicating the pressurized oil from the pressure regulator subsystem to the selection valve.

11. A hydraulic control system for a continuously variable transmission (CVT) to control a primary pulley and a secondary pulley linked by a chain or belt, the hydraulic control system comprising:

a pressure regulator subsystem providing a pressurized oil;

a selection valve in downstream fluid communication with the pressure regulator subsystem, the selection valve configured to control a flow of pressurized oil from the pressure regulator subsystem to a primary pulley circuit and a secondary pulley circuit, the primary pulley circuit in fluid communication with the primary pulley and the secondary pulley circuit in communication with the secondary pulley, wherein the selection valve is configured to communicate the flow of pressurized oil from the pressure regulator subsystem to whichever of the primary pulley circuit and the secondary pulley circuit has less oil pressure;

a ratio control pump disposed in fluid communication between the primary pulley circuit and the secondary pulley circuit, wherein rotation of the ratio control pump in a first direction pumps pressurized oil from the secondary fluid line to the primary fluid line and rotation of the control pump in a second direction pumps pressurized oil from the primary pulley circuit to the secondary pulley circuit to change a ratio of the CVT, and a speed of rotation of the ratio control pump controls a rate of change of the ratio of the CVT;

a secondary accumulator in fluid communication with the secondary pulley circuit, wherein the secondary accumulator is configured to maintain a pressure in the secondary pulley circuit when the ratio control pump is not rotating; and an electric motor for controlling a rotation direction and rotation speed of the ratio control pump.

12. The hydraulic control system of claim 11 further comprising a primary accumulator in fluid communication with the primary pulley circuit, wherein the primary accumulator is configured to maintain a pressure in the primary pulley circuit when the ratio control pump is not rotating.

13. The hydraulic control system of claim 11 further comprising an anti-drive back mechanism connected to the ratio control pump to selectively prevent the ratio control pump from rotating due to pressure in the primary fluid line or the secondary fluid line.

14. The hydraulic control system of claim 13 wherein the anti-drive back mechanism is connected between the electric motor and the ratio control pump.

15. The hydraulic control system of claim 11 wherein the selection valve includes a spool having a first end land and a second end land each sealed to and slidably disposed within a bore, the bore having a main inlet port disposed between the first end land and the second end land, a primary outlet port disposed between the first end land and the second end land, a primary feedback port disposed at the first end land, a secondary outlet port disposed between the first end land and the second end land, and a secondary feedback port disposed at the second end land, wherein the main inlet port communicates with the pressure regulator subsystem, the primary outlet port and the primary feedback port communicates with the primary pulley circuit and the secondary outlet port and the secondary feedback port communicates with the secondary pulley circuit, and wherein movement of the spool selectively connects the main inlet port with the primary outlet port or connects the main inlet port with the secondary outlet port.

16. The hydraulic control system of claim 11 wherein the selection valve includes a first one-way valve and a second one-way valve disposed end to end and having a main inlet port disposed between the two one-way valves, a primary outlet port disposed at one end of the first one-way valve, and a secondary outlet port disposed at one end of the second one-way valve, wherein the main inlet port communicates with the pressure regulator subsystem, the primary outlet port communicates with the primary pulley circuit, and the secondary outlet port communicates with the secondary pulley circuit, and wherein the first one-way valve prevents fluid communication between the main inlet port and the primary outlet port when a pressure in the primary pulley circuit is greater than a pressure in the secondary pulley circuit and the second one-way valve prevents fluid communication between the main inlet port and the secondary outlet port when a pressure in the secondary pulley circuit is greater than a pressure in the primary pulley circuit.

17. The hydraulic control system of claim 11 wherein the ratio control pump includes a first primary port and a second primary port each in fluid communication with the primary pulley circuit, a first secondary port and a second secondary port each in fluid communication with the secondary pulley circuit, and rotation of the ratio control pump in the first direction pumps oil from the first secondary port to the first primary port and from the second secondary port to the second primary port, and rotation of the ratio control pump in the second direction pumps oil from the first primary port to the first secondary port and from the second primary port to the second secondary port.

18. A hydraulic control system for a continuously variable transmission (CVT) to control a primary pulley and a secondary pulley linked by a chain or belt, the hydraulic control system comprising:

a pressure regulator subsystem providing a pressurized oil;

a selection valve in downstream fluid communication with the pressure regulator subsystem, the selection valve configured to control a flow of pressurized oil from the pressure regulator subsystem to a primary pulley circuit and a secondary pulley circuit, the primary pulley circuit in fluid communication with the primary pulley and the secondary pulley circuit in communication with the secondary pulley, wherein the selection valve is configured to communicate the flow of pressurized oil from the pressure regulator subsystem to whichever of the primary pulley circuit and the secondary pulley circuit has less oil pressure;

a ratio control pump disposed in fluid communication between the primary pulley circuit and the secondary pulley circuit, wherein rotation of the ratio control pump in a first direction pumps pressurized oil from the secondary fluid line to the primary fluid line and rotation of the control pump in a second direction pumps pressurized oil from the primary pulley circuit to the secondary pulley circuit to change a ratio of the CVT, and a speed of rotation of the ratio control pump controls a rate of change of the ratio of the CVT;

an electric motor interconnected to the ratio control pump for controlling a rotation direction and rotation speed of the ratio control pump;

an anti-drive back mechanism connected between the electric motor and the ratio control pump to selectively prevent the ratio control pump from rotating due to pressure in the primary fluid line or the secondary fluid line when the electric motor is off;

a primary accumulator in fluid communication with the primary pulley circuit, wherein the primary accumulator is configured to maintain a pressure in the primary pulley circuit when the electric motor is off; and a secondary accumulator in fluid communication with the secondary pulley circuit, wherein the secondary accumulator is configured to maintain a pressure in the secondary pulley circuit when the electric motor is off.

* * * * *